March 11, 1969     O. L. COLWELL     3,432,177
CYLINDER SLEEVE SEAL
Filed Dec. 28, 1965
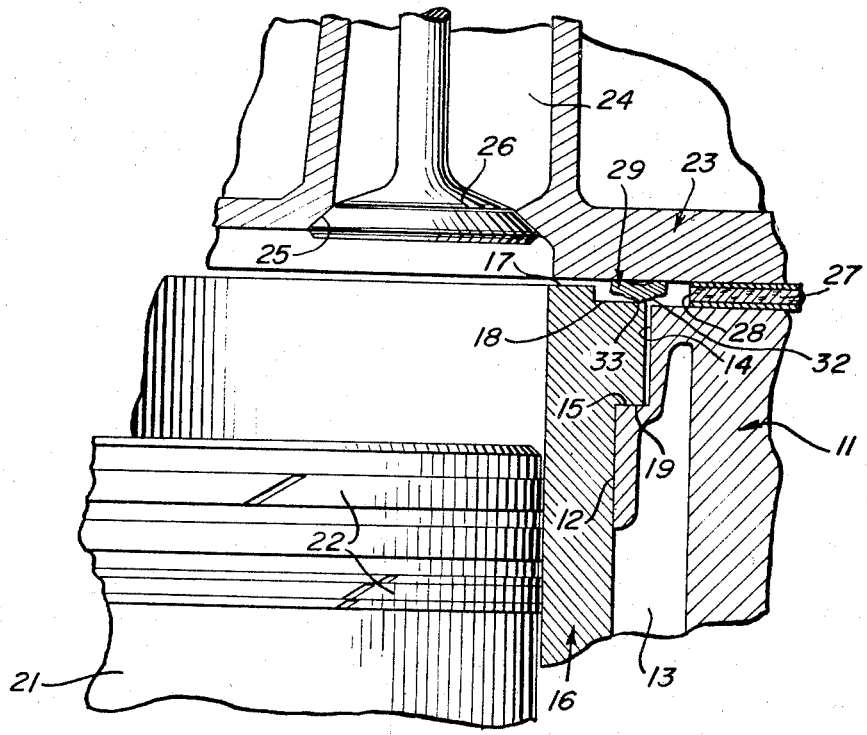
Fig. 1
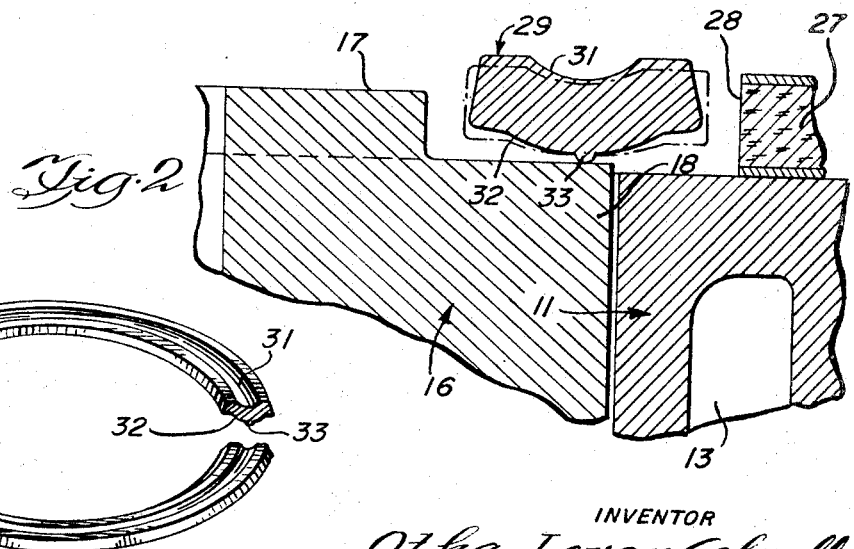
Fig. 2
Fig. 3
INVENTOR
Otha Leroy Colwell
BY Dressler, Goedsmith, Clement, Gordon & Ladd
ATTORNEYS

United States Patent Office 3,432,177
Patented Mar. 11, 1969

3,432,177
CYLINDER SLEEVE SEAL
Otha Leroy Colwell, Mount Prospect, Ill., assignor to Felt Products Mfg. Co., a corporation of Illinois
Filed Dec. 28, 1965, Ser. No. 518,753
U.S. Cl. 277—205
Int. Cl. F16j 15/48, 15/32, 9/08; F16k 41/00
3 Claims

ABSTRACT OF THE DISCLOSURE

An annular resilient gasket for sealing the cylinder bores of an internal combustion engine has an arcuate cross sectional configuration providing two annular flat surfaces separated by an annular concave surface, and a convex surface having an annular rib. When the gasket is compressed between the cylinder head and a flange of the cylinder sleeve, the downward pressure is concentrated against the annular rib. The downward pressure spreads the outer edges of the gasket slightly, thereby providing a very tight sealing engagement between the annular flat surfaces of the gasket and the underside of the cylinder head.

---

This invention relates to a cylinder sleeve seal for internal combustion engines, and is particularly concerned with an annular gasket adapted to provide an effective seal surrounding the upper end of a cylinder bore between the cylinder block and cylinder head.

The annular gasket of the present invention has a concave upper surface and a generally convex lower surface. The concave upper surface provides two concentric spaced annular sealing zones between the gasket and the lower surface of the cylinder head. The convex surface of the gasket is provided with an annular rib adapted to engage the flange of a cylinder sleeve along a circle concentric with the two first mentioned sealing zones. The diameter of the circular sealing zone between the rib of the gasket and the flange of the cylinder sleeve is larger than the diameter of the smaller of the first mentioned sealing zones, and smaller than the diameter of the larger of said sealing zones.

In its uncompressed condition, the outer edge portions of the upper surface of the gasket are disposed in a plane above the upper surface of the cylinder sleeve when the gasket is seated in engagement with the flange of the cylinder sleeve. The upper surface of the gasket preferably comprises two annular flat surfaces separated by an annular surface that is concave in cross section.

When the cylinder head is positioned on the block, the pressure of the head forces the opposite edge portions of the gasket downwardly, but the convexity of the lower surface of the gasket is sufficient to keep the edge portions spaced from the surface of the sleeve or block. Accordingly, the downward pressure is concentrated against the annular rib to increase the effectiveness of the sealing engagement between the rib and the flange of the cylinder sleeve. The downward pressure also spreads the outer edges slightly, thereby providing a very tight sealing engagement between the annular flat surfaces of the gasket and the underside of the cylinder head.

Suitable structure, by means of which the above mentioned and other advantages of the invention are attained, will be fully described in the following specification, taken in conjunction with the accompanying drawings, showing a preferred illustrative embodiment of the invention, in which:

FIGURE 1 is a fragmentary cross-sectional view of one cylinder of an internal combustion engine, showing the gasket of the present invention in the environment in which it is used to form a cylinder sleeve seal;

FIGURE 2 is an enlarged fragmentary cross-sectional view showing the gasket in its uncompressed position and indicating its compressed position in broken lines; and FIGURE 3 is a perspective view of a gasket embodying the invention, with a portion thereof broken away to show the cross-sectional configuration of the gasket.

In the drawings, a cylinder block 11 is provided with a bore 12 and a passageway 13 for the circulation of water or other coolant used to dissipate the heat of the engine. The upper end of the bore 12 is counterbored, as indicated at 14, to provide a horizontal shoulder 15. A cylinder sleeve 16, positioned in the bore 12, has an annular rim 17 at its upper edge and an annular flange 18 extending outwardly therefrom. The plane of the rim 17 is above the upper surfaces of the flange and the cylinder block. The bottom 19 of the flange 18 seats on the shoulder 15. A piston 21, fitted with piston rings 22, is mounted for reciprocatory movement in the cylinder sleeve 16.

After the piston is positioned in the bore 12, a cylinder head 23 is secured to the top of the cylinder block 11. The cylinder head has an opening 24 provided at its bottom with a valve seat 25 for an exhaust valve 26. An intake valve (not shown) is housed in another opening above the cylinder in a similar manner.

The space between the cylinder head and the block is sealed by a gasket 27 in the areas remote from the bore. The gasket 27 has an opening of larger diameter than the counterbore 14 and concentric therewith so that its inner edge 28 defining the opening is spaced outwardly from the edge of the cylinder block defining the counterbore. The gasket 27 is slightly thicker than the space between the head and block, so that when the head is tightened against the block, the gasket is compressed to provide an effective seal in the area where it is used. The gasket 27 may be made of any conventional compressible gasket material because the cylinder block is relatively cool in the areas covered by the gasket.

In accordance with the present invention, there is provided an annular seal between the cylinder sleeve and head in an area circumscribing the upper end of the bore and within the opening in the gasket 27. This seal comprises an annular gasket 29 of material capable of withstanding high temperature and pressure. The gasket 29 is positioned between the flange 18 and the cylinder head in the area contiguous to the bore. In this area, intense heat and pressure is created by the explosion of fuel in the upper end of the cylinder sleeve, and an effective seal must prevent the escape of hot gases.

The gasket 29 has an inner diameter larger than the outer diameter of the rim 17 and smaller than the outer diameter of the flange 18. The outer diameter of the gasket 29 is larger than the outer diameter of the flange 18 and smaller than the diameter of the opening in the gasket 27. The gasket 29 is curved transversely to provide a concave surface 31 on its top face and a convex surface 32 on its bottom face. An annular rib 33 projects vertically from the crest of the convex surface 32.

When the gasket 29 is positioned for use, the annular rib 33 is seated on the flange 18 with the inner edge of the gasket spaced above the flange 18, and the outer edge of the gasket spaced above the cylinder block within the area defined by the opening in the gasket 27. When the cylinder head is bolted to the cylinder block, the gasket 29 is deformed to the position indicated in broken lines in FIGURE 2. In this position, the edges of the gasket 29 are spread outwardly and depressed slightly, but still are located in a plane above the top surface of the rim 17 and form two spaced annular sealing zones between the gasket and the cylinder head. The downward force exerted by the cylinder head against the gasket 29 is concentrated in the area of contact between the rib 33 and the top surface of the flange 18, thus forming an effective seal between the gasket and the flange in another annular zone circumscribing the bore of the cylinder sleeve.

The gasket 29 retains its resilience under compression and recovers its convex-concave shape to a substantial extent whenever the cylinder head is removed from the block. This substantial recovery of its shape upon removal of the cylinder head confirms the spring-rate properties of the novel sleeve seal.

The gasket 29 not only confines the explosion pressure within the upper portion of the cylinder sleeve, but also prevents transmission of excessive temperatures to the gasket 27 and provides a seal at the top of the joint between the block 11 and the sleeve 16. As shown in FIGURE 1, a portion of the outer surface of the sleeve 16 forms one wall of a portion of the passageway 13. The seal provided by the gasket 29 prevents any coolant that may seep through the annular joint between the cylinder block and the cylinder sleeve from flowing into contact with the inner surface of the cylinder sleeve.

Although a preferred embodiment of the invention has been described in considerable detail, it will be understood that the description thereof is intended to be illustrative, rather than restrictive, as many details of construction may be modified or changed without departing from the spirit or scope of the invention. Accordingly, it is not desired to be restricted to the exact construction disclosed.

What is claimed is:

1. In combination, a cylinder block having a bore, a cylinder sleeve mounted in said bore, said sleeve having an annular rim and an outwardly extending annular flange below the plane of said rim, said flange having a substantially flat upper surface, a cylinder head secured to said block and having a substantially flat lower surface spaced from and generally parallel with said flange surface, a transversely curved annular gasket having a generally concave upper surface flanked by symmetrically arranged inner and outer head engaging portions, said gasket having a generally convex lower surface including a flange engaging midportion, said gasket being positioned with the midportion of said convex surface engaging the upper surface of said flange and with the head engaging portions disposed in a plane above the upper surface of the rim in the uncompressed state of said gasket, the area beneath each head engaging portion being entirely open whereby said head engaging portions can move downwardly without impediment, said head uniformly compressing said gasket to hold the midportion of said convex surface in sealing engagement with the upper surface of the flange and to spread the head engaging portions to retain their inner head engaging portions in sealing engagement with the lower surface of the head and to retain the outer head engaging portion in supporting and load balancing engagement with the lower surface of the head.

2. The combination set forth in claim 1 wherein said head engaging portions include generally flat surfaces disposed in a plane parallel with the lower surface of said head, whereby spaced concentric flat sealing areas are provided between said head and gasket.

3. The combination set forth in claim 1 wherein an annular rib extends downwardly from the midportion of said convex lower surface into engagement with the upper surface of said flange, said rib being dimensioned to concentrate pressure applied against said head engaging portions to increase the effectiveness of the sealing engagement between the rib and the upper surface of the flange.

References Cited

UNITED STATES PATENTS

| | | | |
|---|---|---|---|
| 2,378,045 | 6/1945 | Sorensen et al. | 277—213 X |
| 2,939,753 | 6/7960 | Schilling et al. | 92—171 |
| 3,139,009 | 6/1964 | Härting | 92—171 |
| 3,147,015 | 9/1964 | Hanback | 277—205 |
| 3,209,659 | 10/1965 | Colwell | 92—171 |

LAVERNE D. GEIGER, *Primary Examiner.*

JEFFREY S. MEDNICK, *Assistant Examiner.*

U.S. Cl. X.R.

92—171; 123—41.84, 193; 277—207, 236